Figure 1:
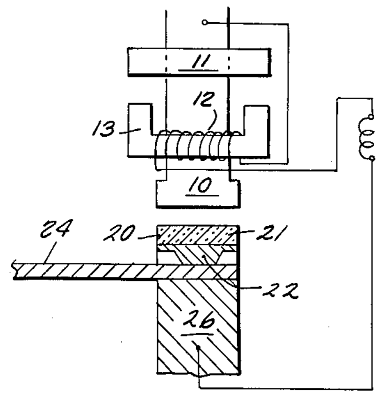

May 15, 1962

H. C. GRAVES, JR 3,034,202

CONTACT FOR FORGE WELDING METHODS

Filed Jan. 23, 1957

INVENTOR.
HERBERT C. GRAVES, JR.

BY Ostrolenk, Faber, Gerb & Soffen

ATTORNEYS

United States Patent Office 3,034,202

Patented May 15, 1962

3,034,202

CONTACT FOR FORGE WELDING METHODS

Herbert C. Graves, Jr., Pittsburgh, Pa., assignor to Gibson Electric Company, Pittsburgh, Pa., a corporation of Pennsylvania Filed Jan. 23, 1957, Ser. No. 635,851
2 Claims. (Cl. 29—155.55)

This invention relates to an electrical contact suitable for attachment to an electrically conductive metallic arm by forge welding methods. More particularly, it relates to specific shapes and types of contacts and a method for attaching the same which will be advantageous when using forge welding techniques.

Various methods for attaching electrical contacts to conductive supports are well known to the art. Such techniques include spot and projection welding, soldering, brazing, etc. Welding offers an important advantage in that it is fast and consequently economical. However, until relatively recently there were certain limitations on the types of contacts which could be attached by this method. Prior to the development of the forge welder, it was usually found that the contact, or a portion thereof, should be a relatively high resistance material so that passage of electricity through the material would generate the necessary heat to melt and fuse the backing portion of the contact to the support. Typically such contacts might take the form of the silver facing on a backing of steel, Monel, or similar backing. In general it was a requirement that the backing material should not only be highly resistant, but also should be one which would fuse and alloy with the supporting member. Thus, it was impossible to attach high conductivity metals such as silver or copper to themselves or to such common supporting materials as copper, bronze, beryllium-copper, phos-bronze, etc.

Neither was it possible to attach by welding, combinations which included both a high conductivity metal and a high refractory metal. Typical of such combinations are silver-tungsten, silver-tungsten carbide, silver-molybdenum, and copper-tungsten. In order to weld such combinations it was first necessary to braze or silver solder the silver-tungsten contact to the weldable backing after which the welding operation could be accomplished.

Development of the forge type welder changed this picture to some extent. For instance, it was found that high conductivity materials, such as silver or copper, could be welded directly to themselves or alloys containing a high proportion of these materials. It was even further found that silver-tungsten type contacts fabricated by a certain production technique could also be attached satisfactorily on the forge welder. However, silver-tungsten type contacts produced by an alternate and better processing could not be properly attached. It is the latter type contact with which this invention is concerned.

Accordingly, it is an object of this invention to provide a contact of a novel shape and construction particularly suitable for use in connection with forge welding.

Another object is to provide a method whereby electrical contacts may be effectively welded to a supporting arm by forge welding techniques.

The forge welder is similar to conventional welders in that it consists of two electrodes connected to the secondary of a welding transformer. One electrode is caused to bear against the supporting arm while the other urges the contact against said supporting arm. Passage of welding current causes heating, melting, and fusion at the interface between contact and supporting arm. However, the forge welder differs from the conventional welder in that the former is provided with a means of exerting a hammer-like blow on one, usually the moving, electrode during the time the welding current flows. It is this particular refinement which is responsible for the improvement in welding techniques such that combinations can now be welded which were previously thought to be non-weldable.

One type of forge welder is known as a magnetic forge welder and derives its name from the manner in which the hammer-like blow is exerted. This welder includes a light, low-inertia upper electrode assembly to which is attached a magnetic armature. The welder also includes a one or two turn coil suitably mounted on a magnetic yoke. The electromagnet, in turn, is so mounted on the machine that energizing the coil thereof causes an attraction and movement of the magnetic armature and consequently the upper or moving electrode assembly. The electro-magnetic coil is actually connected in series with the welding transformer and electrodes. Obviously, this means that the armature and moving electrode assembly will be moved by virtue of magnetic forces during the time of flow of welding current. It is also obvious that the point in time at which the hammer-like blow is exerted can be varied over a wide range by any one of several expedients. Such expedients might include varying the air gap between armature and yoke as well as exerting bucking magnetic forces on the armature.

Another type of welding equipment includes a pneumatic cylinder on the upper electrode. Admission of air at the proper time in this air cylinder causes the upper electrode to move and exert the hammer-like blow.

Electrical contacts made by powder metallurgy techniques are well known in the art. There are two types and in each case they derive their name from the processes by which they are made.

The press-repress type is produced by blending together powders of the constituents to be joined, inserting the blend into a cavity of appropriate shape and compacting the same so as to form a slug or briquette. This is then sintered by heating at an elevated and appropriate temperature in the proper atmosphere, usually reducing in nature. This operation may be repeated depending upon what particular properties are desired in the material.

The second type of refractory contact is known as the infiltrated type. In this case a porous slug is obtained by compacting in a cavity the refractory powder, such as tungsten. This porous skeleton or slug is then sintered so as to bond the tungsten particles together thus making a strong structure. Thereafter, a piece of highly conductive metal, such as silver or copper, is placed on top of the porous slug and this assembly inserted in a furnace held at a temperature sufficient to melt the silver or copper. The atmosphere is reducing in nature, usually hydrogen, and the operation is carried out long enough for the highly conductive metal to melt and, by virtue of gravity and capillarity, seek out and fill the pores of the sintered slug.

These powder metallurgy type contacts are well known as are construction which render them suitable for soldering or brazing. However, there has not, heretofore, been available a contact of the infiltrated type which could be suitably welded to a supporting arm.

Essentially the present invention involves an electrical contact of the infiltrated type which can be welded to its supporting arm. More particularly it is concerned with an electrical contact for attachment to a metallic supporting arm which comprises a porous body of predominantly pressed and sintered refractory material. The contact body is infiltrated with a conductive metal and has, on one surface thereof, at least one coined projection of the said infiltrating conductive metal.

Figure 2:
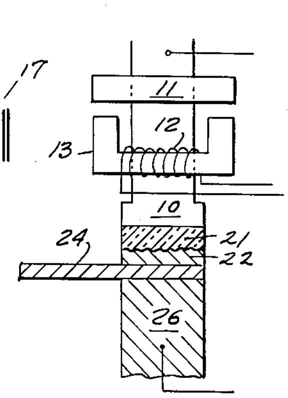
Figure 3:
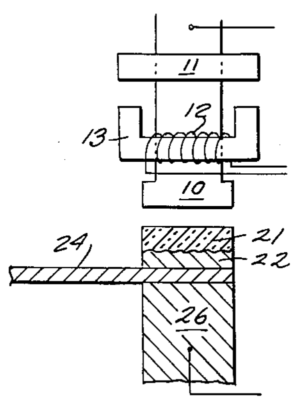

The following description of the invention will be clearer and more apparent when illustrated by the drawings in which:

FIGURES 1, 2 and 3 represent three steps in a magnetic welding operation as practiced in accordance with the present invention.

FIGURES 4–4*a* through 8–8*a* illustrate top and cross-sectional elevational views of the various types of contacts which have been found suitable for forge welding.

Referring to the drawings, the sequence of events occurring in the magnetic welding operation is evident from an inspection of FIGURES 1, 2 and 3. It can be seen that the welding equipment comprises a movable light weight electrode 10 to which is attached a magnetic armature 11. A coil 12 is wound on a suitable magnetic yoke 13. This coil is connected in series with the secondary of the welding transformer 17 and therefore, carries welding current.

Arm 24 to which the contact 20 is to be attached is placed against lower electrode 26. The contact 20 is placed on top of arm 24 in such a manner that the projection 22 on the back of the contact is against the arm 24.

The upper electrode 10 is moved down so as to urge the contact 20 against supporting arm 24 and electrode 26. Welding current is allowed to flow and the heat generated between projection 22 and arm 24 causes projection 22 to be softened and melted. After an appropriate time of flow of welding current the magnetic armature 11 is attracted towards the yoke thus moving electrode 10 downwardly causing the softened and melted silver to flow out and smear around thus forming the bonding layer 22 as shown in FIGURE 2.

The welded assembly is held together after current ceases to flow for a period of time sufficient to allow proper cooling after which upper electrode 10 is raised so as to allow removal of the assembly from the machine.

The contacts of the present invention may take several embodiments as shown in FIGURES 4 through 8, respectively. In all cases the contacts are produced by pressing a porous refractory slug, with or without serrations, sintering said slug, and thereafter infiltrating this slug with the highly conductive metal in such a manner that an excess of highly conductive metal is retained on one surface of the contact. The contact with excess is then coined or struck with a formed tool which will produce a projection or projections of the desired size. It is the excess highly conductive material which is formed into the desired projections.

A preferred embodiment of the invention includes the use of serrations on the contact as pressed. The presence of these serrations helps to spread the excess metal over the surface of the contact so as to get complete coverage and further helps to contain said excess within desired boundaries on the contact. However, it is essential that all serrations or portions containing refractory material be covered with the highly conductive metal.

Referring now to FIGURES 4–4*a* through 8–8*a* in more detail, it is seen that in each embodiment the refractory bodies 40, 50, 60, 70, and 80, respectively, have corresponding serrated surfaces 43, 53, 63 and 73 which are covered with essentially pure silver or copper shown as layers 41, 51, 61, 71 and 81 respectively. The projections coined on the silver or copper layer shown as 42, 52, 62, 72 and 82, respectively, are also essentially pure silver or copper. Thus the composition of such projections are not intended to include the low melting alloys which are commonly used in connection with soldering or brazing operations, as such alloys could not accomplish the purpose here intended. In addition, the slow and costly operation of coating the surface with silver solder or brazing alloy is avoided.

For the purposes of the present invention it is necessary that the infiltrating surface be provided with sufficient silver or copper to coat said surface and, in addition, enough additional silver or copper must be provided such that a projection of this material can also be coined. Thus the surface of the contact to be joined to the arm is provided with a coating of the conductive infiltrant.

Figure 4:
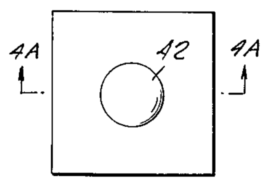
Figure 5:
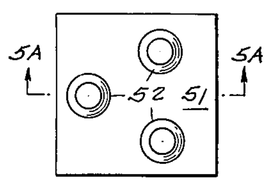
Figure 6:
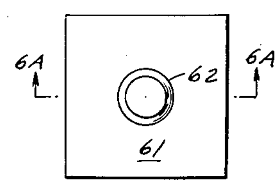
Figure 4A:
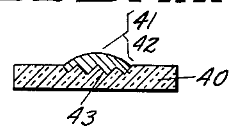
Figure 5A:
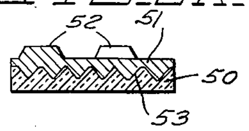
Figure 6A:
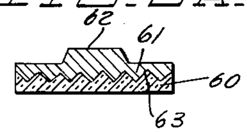
Figure 7:
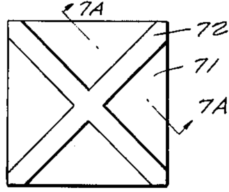
Figure 8:
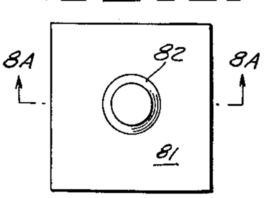
Figure 7A:
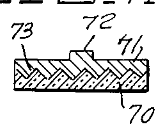
Figure 8A:
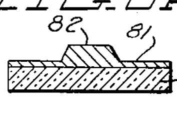

The requirement of coating the entire back surface of the contact is avoided if a limited area, or nugget, weld is desired and deemed sufficient. The contact shown in FIGURE 4 is an example of the latter type. In any of the examples shown, however, it is essential that sufficient silver or copper remain on the serrated surface of the refractory compact so that the lowermost point on the exposed surface of the silver or copper projection is at least as high and preferably .001 inch higher than the uppermost peak of the serrated refractory surface thereby causing a complete bond of silver or copper between the contact and its support upon forge welding.

Specific welding tests performed on contacts contemplated by the present invention have shown that extremely strong tenacious welds are obtained. Microscopic examination of the weld area indicates no voids or porosity present. Mechanical testing of a destructive nature on such assemblies showed that a strong joint was obtained and where failure occurred it was in one of the members being joined rather than at the joint itself.

In the foregoing, the present invention has been described only in connection with preferred embodiments thereof. For example, the contact of the present invention has also been formed to be used in connection with spot welding techniques. Many variations and modifications of the principles of the invention within the scope of the description herein are obvious. Accordingly, the scope of the invention is to be bound not by the specific disclosure herein, but only by the appended claims.

I claim:

1. The method for attaching an electrical contact to a metallic, current-carrying supporting arm comprising the steps of forming a refractory body by pressing and sintering techniques, effecting serrations on a face of said body, infiltrating said refractory body on said serrated face with a conductive metal from group consisting of silver and copper and coining on the infiltrated surface an excess of said infiltrant so as to form at least one projection of said conductive metal, said projection being of such thickness that the lowermost exposed surface thereof is as least as high as the uppermost point in the underlying refractory body, and subsequently forge welding said contact to the supporting arm by heating the same through the passage of a welding current through said contact and arm and a hammer-like pressure applied during the passage of the said welding current thereby welding the said projecting area onto the metallic support.

2. The method for attaching an electrical contact to a metallic, current-carrying supporting arm comprising the steps of forming a refractory body by pressing and sintering techniques, effecting serrations on a face of said body, infiltrating said refractory body on said serrated face with a malleable conductive metal and coining on the infiltrated surface an excess of said infiltrant so as to form at least one projection of said conductive metal, said projection being of such thickness that the lowermost exposed surface thereof is at least as high as the uppermost point in the underlying refractory body, and subsequently forge welding said contact to the supporting arm by heating the same through the passage of a welding current through said contact and arm and a hammer-like pressure applied during the passage of the said welding current thereby welding the said projecting area onto the metallic support.

References Cited in the file of this patent

UNITED STATES PATENTS

| | | |
|---|---|---|
| 1,132,094 | Hosford | Mar. 6, 1915 |
| 1,744,810 | Shallcross | Jan. 28, 1930 |
| 2,086,221 | Gwyn | July 6, 1937 |
| 2,181,083 | Payette | Nov. 21, 1939 |
| 2,298,999 | Allen | Oct. 13, 1942 |
| 2,414,463 | Gunn et al. | Jan. 21, 1947 |
| 2,641,670 | Graves | June 9, 1953 |
| 2,700,087 | Stevens | Jan. 18, 1955 |
| 2,706,759 | Williamson | Apr. 19, 1955 |
| 2,707,889 | Sowter | May 10, 1955 |
| 2,723,444 | Harvey | Nov. 15, 1955 |
| 2,799,081 | Farnham | July 16, 1957 |